United States Patent
Ogier et al.

(10) Patent No.: US 9,004,989 B1
(45) Date of Patent: Apr. 14, 2015

(54) VACUUM APPARATUS AND PRODUCT RECOVERY METHOD

(71) Applicants: Mark A. Ogier, Green Forest, AR (US); Timothy J. Ogier, Alpena, AR (US)

(72) Inventors: Mark A. Ogier, Green Forest, AR (US); Timothy J. Ogier, Alpena, AR (US)

( * ) Notice: Subject to any disclaimer, the term of this patent is extended or adjusted under 35 U.S.C. 154(b) by 0 days.

(21) Appl. No.: 14/091,731

(22) Filed: Nov. 27, 2013

(51) Int. Cl.
*A22C 21/00* (2006.01)

(52) U.S. Cl.
CPC .................................. *A22C 21/0069* (2013.01)

(58) Field of Classification Search
USPC .......... 452/125, 132, 133, 135–140, 149, 198
See application file for complete search history.

(56) References Cited

U.S. PATENT DOCUMENTS

| | | | | |
|---|---|---|---|---|
| 4,202,076 A | * | 5/1980 | Rancatore | 452/8 |
| 4,449,406 A | * | 5/1984 | van Haren | 73/433 |
| 5,490,453 A | * | 2/1996 | Mackay | 99/495 |
| 5,623,744 A | * | 4/1997 | Triplett et al. | 15/326 |
| 5,741,397 A | * | 4/1998 | Kraver | 159/25.2 |
| 5,772,950 A | * | 6/1998 | Brustad et al. | 264/510 |
| 6,170,118 B1 | * | 1/2001 | McIntyre et al. | 15/327.6 |
| 6,802,429 B1 | * | 10/2004 | Wildman | 220/314 |
| 7,107,887 B2 | | 9/2006 | Whited | |
| 7,282,074 B1 | * | 10/2007 | Witter | 55/300 |
| 7,770,576 B2 | * | 8/2010 | Polkinghorn et al. | 126/194 |
| 8,161,597 B2 | * | 4/2012 | Witter et al. | 15/347 |
| 8,563,264 B2 | * | 10/2013 | Halverson et al. | 435/30 |

OTHER PUBLICATIONS

FPZ, Inc., "Regenerative Blowers", Pneumatics online, Apr. 2000 Product News.

* cited by examiner

*Primary Examiner* — Richard Price, Jr.
(74) *Attorney, Agent, or Firm* — Dennis D. Brown; Bown Patent Law, P.L.L.C.

(57) ABSTRACT

A vacuum apparatus and method for recovering poultry breast sub-tenders or other trim products from poultry or meat carcass shells, or for recovering other materials. The apparatus has a cover which can be lowered on to a base to form a vacuum chamber. One or more vacuum hoses extend from the apparatus for suctioning the product into the vacuum chamber. A product container is removably positioned in the vacuum chamber such that the product suctioned into the vacuum chamber will fall into the product container by gravity.

12 Claims, 3 Drawing Sheets

VACUUM APPARATUS AND PRODUCT RECOVERY METHOD

FIELD OF THE INVENTION

The present invention relates to a vacuum apparatus and method for recovering meat or poultry trim products from carcass shells or for recovering other products.

BACKGROUND OF THE INVENTION

A need exists for an improved system and method for recovering poultry sub-tenders or other poultry or meat trim products which still remain on the carcass shells at the end of a carcass processing line.

Some prior art systems used heretofore for recovering breast sub-tenders from chicken carcass shells have been comprised of an air amplifier venturi apparatus; a suction hose which can be extended from the venturi apparatus to the chicken carcass shells at the end of a cone processing line; and a rotary knife secured on the distal end of the suction hose for use in detaching the breast sub-tenders from the chicken carcass shells.

Unfortunately, these prior art air amplifier venturi systems have had various significant shortcomings and disadvantages. For example, when the sub-tender product traveling through the product suction hose reaches the venturi apparatus, the product is contacted by and mixes with the compressed (pressurized) motive air stream which must be delivered through the venturi device in order to produce a vacuum suction pressure. This compressed (pressurized) air, which is typically supplied by the plant air system, will often contain oil or other contaminates, thus requiring the installation of costly filtration and/or other systems to remove such contaminants. Also, because of the other demands for compressed air which are typically placed on the plant air system, the plant air system often will not have sufficient remaining capacity to also operate an air amplified venturi recovery system.

SUMMARY OF THE INVENTION

The present invention provides a vacuum apparatus and method which satisfy the needs and alleviate the problems discussed above. The inventive vacuum apparatus and method prevent product contamination, do not require a compressed air supply, and can be used for recovering not only poultry and meat trim products, but also generally any other product of a type which can be conveyed by vacuum through a suction hose. The inventive vacuum apparatus and method are particularly well suited for recovering such products in applications where controlled collection and easy removal of the collected product are desired or necessary. For example, in one alternative application, the inventive vacuum apparatus and method can be used for cleaning out and recovering seed from planter boxes used on planters or used on no tillage drills.

In one aspect, there is provided an apparatus for recovering a product wherein the apparatus comprises: a vacuum chamber having at least one product suction opening; a product container having a top opening, the product container being removably positionable in the vacuum chamber with the top opening positioned elevationally below the product suction opening such that a product suctioned into the vacuum chamber through the product suction opening will fall into the product container by gravity; a cover for the vacuum chamber which is openable for positioning the product container in and removing the product container from the vacuum chamber; and a suction device positioned outside of the vacuum chamber and having a suction inlet in fluid communication with the vacuum chamber.

In another aspect, there is provided an apparatus for recovering a product comprising: a base structure; a cover which has an interior and is lowerable onto the base structure to form a vacuum chamber; at least one product suction opening in the cover; a product container removably positionable in the vacuum chamber wherein, when the product container is positioned in the vacuum chamber and the cover is lowered onto the base structure, a top opening of the product container will be located elevationally below the product suction opening and at least most of a vertical height of the product container will be received in the interior of the cover; a regenerative blower positioned outside of the vacuum chamber; and a conduit extending between a suction inlet of the regenerative blower and the vacuum chamber for producing a vacuum pressure in the vacuum chamber.

In another aspect, there is provided a method of recovering a poultry or meat trim product from a carcass shell comprising the steps of: (a) producing a vacuum pressure in a vacuum chamber; (b) extending a product suction conduit from a suction inlet of the vacuum chamber to the carcass shell; (c) suctioning a trim product through the suction conduit from the carcass shell into the vacuum chamber; and (d) receiving and collecting the trim product suctioned into the vacuum chamber in step (c) in a trim product container positioned in the vacuum chamber.

Further aspects, features, and advantages of the present invention will be apparent to those of ordinary skill in the art upon examining the accompanying drawings and upon reading the following Detailed Description of the Preferred Embodiments.

DETAILED DESCRIPTION OF THE PREFERRED EMBODIMENTS

Figure 1:
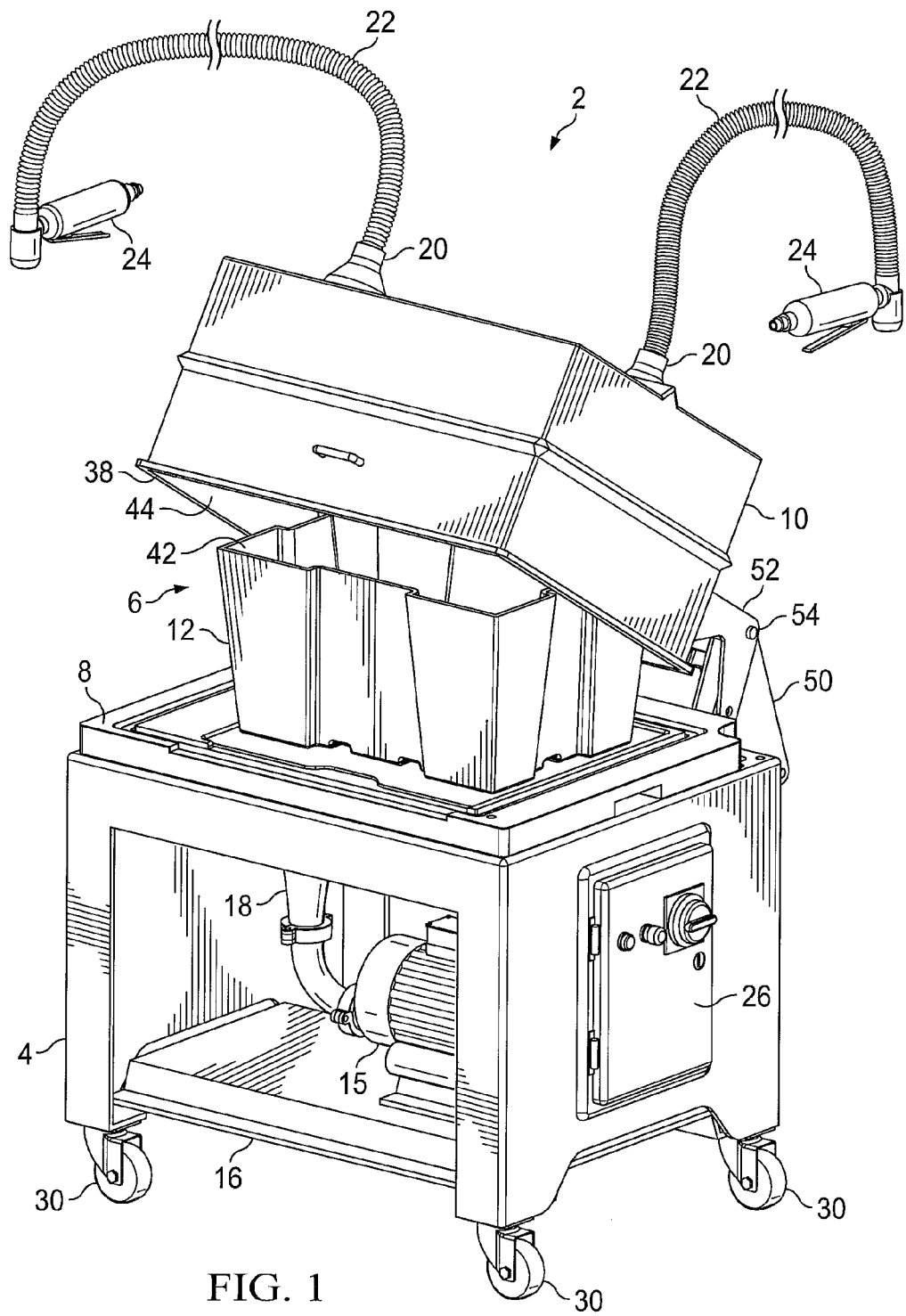
FIG. 1 is a front perspective view of an embodiment 2 of the inventive vacuum apparatus.
Figure 2:
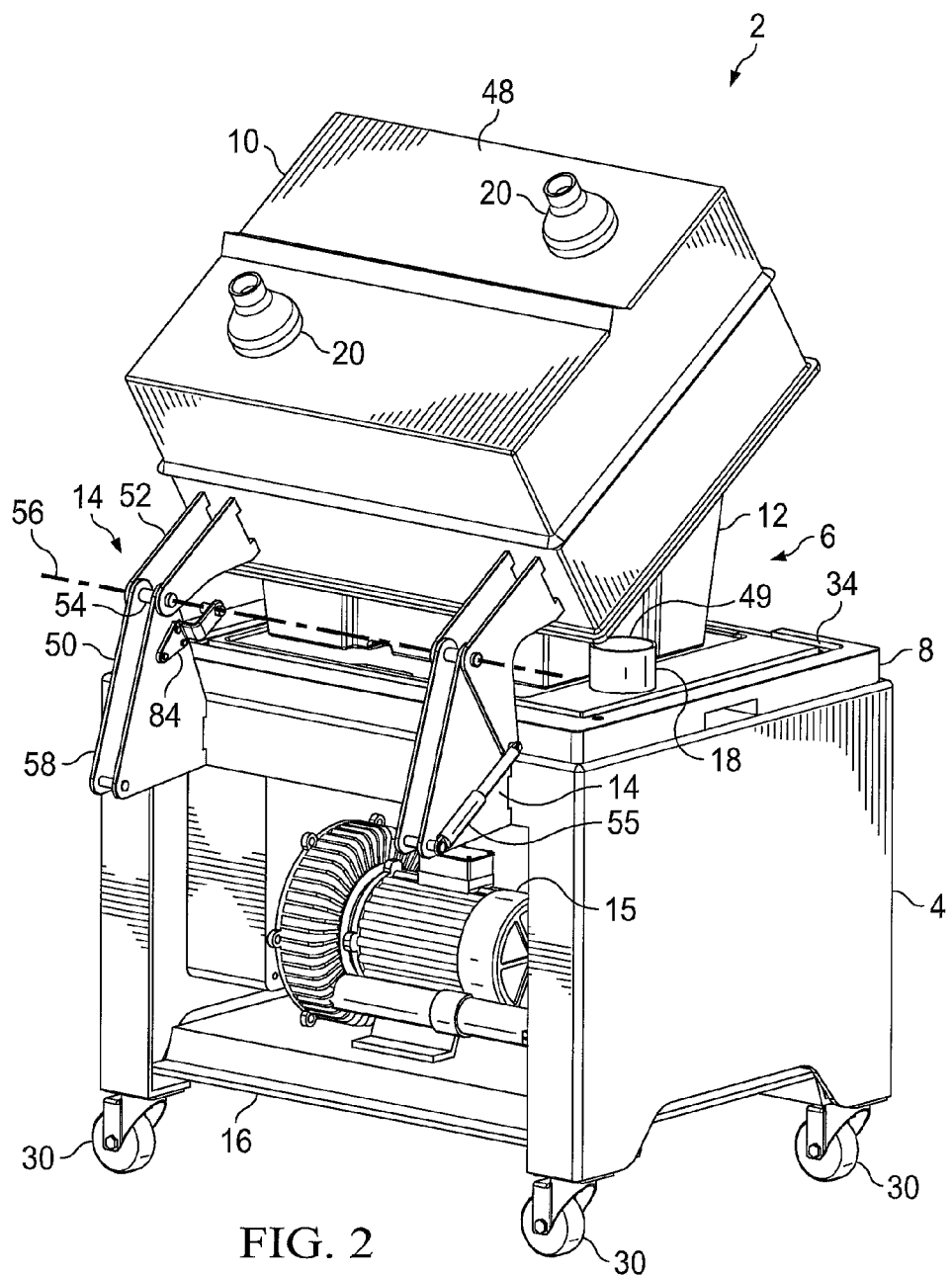
FIG. 2 is a rear perspective view of the inventive vacuum apparatus 2.
Figure 3:
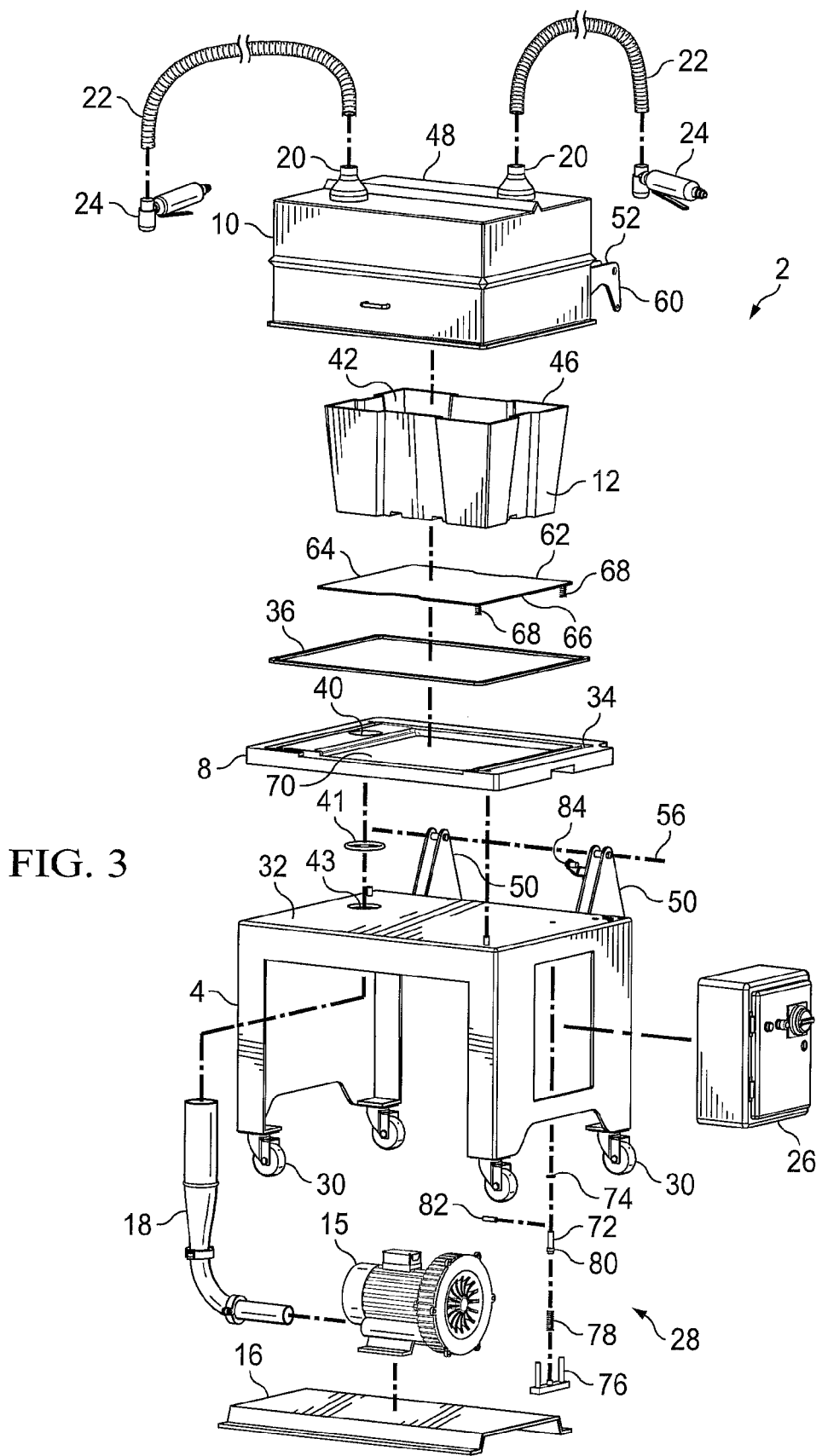
FIG. 3 is an exploded perspective view of the inventive vacuum apparatus 2.

An embodiment 2 of the inventive vacuum apparatus is shown in FIGS. 1-3. The inventive apparatus 2 comprises: a mobile or stationary support structure 4; a vacuum chamber 6; a vacuum chamber base structure 8 which is either positioned on top of or is part of a top portion of the support structure 4; a vacuum chamber cover 10 which can be lowered on to or raised off of the vacuum chamber base structure 8 for closing and opening the vacuum chamber 6; a product collection container 12 which is removably positionable in the vacuum chamber 6; and one or more (preferably two) hinge assemblies 14 connected between the cover 10 and the support structure 4 for pivoting the cover 10 downwardly onto and upwardly off of the vacuum chamber base structure 8.

The inventive vacuum apparatus 2 also comprises: a vacuum producing device 15; a mount 16 provided in the support structure 4 for mounting and carrying the vacuum producing device 15; a conduit 18 which is connected to the suction inlet of the vacuum producing device 15 and extends through the vacuum chamber base structure 8 and into the vacuum chamber 6; one or more (preferably two) product suction inlets 20 provided in the cover 10 of the vacuum chamber 6; flexible product suction hoses or other product suction conduits 22 which extend from the vacuum chamber product suction inlets 20; rotary knives 24 optionally secured on the distal ends of the product suction conduits 22 when needed for detaching the product in question (e.g., sub-tenders or other poultry or meat trim products) from a base structure; a system control box 26 mounted in the support structure 4; and a sensor assembly 28 for sensing an amount of product collected in the product collection container 12.

The support structure 4 for the inventive vacuum apparatus 2 is preferably a mobile cart having castors or wheels 30 on the bottom thereof. As noted above, the top 32 of the support structure 4 can, if desired, be constructed or formed to operate directly as the base structure for the vacuum chamber 6.

Most preferably, the vacuum chamber base structure 8 is a panel member which is secured on the top 32 of the support cart 4. The base structure 8 is preferably a machined structure formed of ultra-high molecular weight polyethylene (UHMW) or high density polyethylene (HDPE). A groove 34 is preferably provided in the top surface of the base structure 8 for receiving a silicone rubber gasket or other seal member 36. The shape of the groove 34 and of the seal 36 correspond to the shape of the bottom edge 38 of the vacuum chamber cover 10 so that, when the cover 10 is lowered onto the base structure 8, the seal 36 will be positioned between the base structure 8 and the bottom edge 38 of the cover 10 and will assist in sealing the vacuum chamber 6. Alternatively, or in addition, a gasket or other seal member can be attached around the bottom edge 38 of the vacuum chamber cover 10.

An opening 40 is preferably bored or otherwise machined or formed vertically through the vacuum chamber base structure 8 for receiving the upper end of the suction conduit 18 which extends from the suction inlet of the vacuum producing device 15. A corresponding hole 43 is formed through the top 32 of the cart 4. The hole 40 is preferably cylindrical. The upper end portion of the suction conduit 18 preferably extends through the hole 40 and into the vacuum chamber 6 to a height of from about 2 to about 6 inches. The upper portion of the suction conduit 18 extending into the vacuum chamber 6 is also preferably positioned outside of the product collection container 12. An O-ring or other sealing element 41 is positioned around the suction conduit 18 to seal the gap between the suction conduit 18 and the interior wall of the base structure opening 40.

The product collection container 12 can be generally any type of container which can be removably positioned in the vacuum chamber 6 and is capable of receiving and collecting the product which is suctioned into the vacuum chamber 6 via the vacuum chamber product suction inlet(s) 20. The container preferably has a top opening 42 which is positioned elevationally below the suction inlet(s) 20 such that, as the suctioned product is delivered into the vacuum chamber 6 through the suction inlet(s) 20, the product will fall by gravity into the collection container 12.

Most preferably, the collection container 12 will be a standard tote of the type commonly used, for example, in the poultry industry. The standard industry tote is about 10.75 inches in height and has an open top 42 which is about 23.75 inches by 15.5 inches in size. When used, for example, for collecting chicken breast sub-tenders at the end of a cone processing line operating at normal speed, the tote will typically be filled with from about 60 to about 70 pounds of product and ready for removal and replacement after about one hour of operation.

The cover 10, within which most, substantially all, or all of the vacuum chamber 6 is preferably formed, preferably has a height and an interior volume 44 which are sized such that most, substantially all, or all of the vertical height of the product collection container 12 is received in the interior 44 of the vacuum chamber cover 10 when the cover 10 is closed (i.e., when the vacuum chamber cover 10 is lowered onto the vacuum chamber base structure 8). In addition, a sufficient interior gap is preferably provided between the between the top end 46 of the product container 12 and the top wall 48 of the vacuum chamber cover 10 to allow the free flow of air within the vacuum chamber 6 from the product suction inlets 20 to the open upper end 49 of the vacuum inlet conduit 18. In addition, the product suction inlet(s) 20 of the vacuum chamber 6 is/are preferably located in the top wall 48 of the vacuum chamber cover 10 so that the product suction inlet(s) 20 will be positioned vertically above the top opening 42 of the product collection container 12.

The inventive vacuum apparatus 2 preferably includes two cover hinge assemblies 14 for pivoting the vacuum chamber cover 10 downwardly on to and upwardly off of the vacuum chamber base structure 8. In addition, the hinge assemblies 14 are positioned and configured to operate such that, as the cover 10 is pivoted downwardly onto the base structure 8, the product collection container 12 will be cleanly received within the interior 44 of the cover 10 and the bottom edge 38 of the cover 10 will squarely contact the base seal member 36.

In order to enable the cover to be raised and lowered in this manner, each of the hinge assemblies 14 preferably comprises: a lower stationary base member 50 which is attached to the back of the support structure (cart) 4 at or near the upper end thereof; an upper pivoting member 52 which extends from the back of the cover 10 and is pivotably attached to the upper end portion of the base member 50 by a pivot pin 54; a pivot axis 56, established by the location of the pivot pins 54, which is preferably located at an elevation which is higher than the top of the vacuum chamber base structure 8 and is preferably also spaced rearwardly from the base structure 8; and a gas lift assist cylinder 55 which is connected between a downwardly angle extension 58 of the hinge base member 50 and a pivot arm portion 60 of the hinge pivoting member 52. The lift assist cylinders 55 will operate to hold the vacuum chamber cover 10 in its raised position when the vacuum chamber 6 is open but will allow the cover 10 to be easily closed, preferably by the application of a closing force of ten pound or less.

The vacuum device 15 used in the inventive apparatus 2 can be any device or combination of devices which will produce, or can be regulated to produce, a vacuum pressure (i.e., a pressure which is less than the actual exterior atmospheric pressure) in the vacuum chamber 6 which (a) is effective for suctioning the product in question through the product suction conduit(s) 22 and into the vacuum chamber 6 but (b) will allow the product to fall by gravity in the vacuum chamber 6 into the product collection container 12. The vacuum pressure created in the vacuum chamber 6 will preferably be a pressure which is from about 3 to about 5 inches Hg below actual atmospheric pressure.

The vacuum device 15 will most preferably be a regenerative blower. A regenerative blower is a lower cost, off the shelf component which, unlike typical vacuum pumps and other systems or equipment, can directly produce the preferred amount of vacuum within the vacuum chamber 6 without having to be regulated in some way. Also, the regenerative blower will preferably be electrically powered and therefore will not place any additional demand on the plant air system.

The sensor 28 included in the inventive apparatus 2 for determining the amount of product recovered can be any type of device or assembly known in the art which is capable of (a) determining the weight or volume amount of product material present in the product collection container 12 at any time and/or (b) determining when a specific weight or volume amount of product has been collected (e.g., sensing when the product container 12 is full). When the sensor 28 indicates that the product container is full, the vacuum producing device 15 which will preferably be automatically shut down.

By way of example, but not by way of limitation, the sensor 28 used in the inventive vacuum apparatus 2 as shown in FIG. 3 is an assembly comprising: (1) a plate or other container support element 62 having a left edge 64 which is in contact with the top of the vacuum chamber base structure 8 and a right end 66 which is supported by a pair of compression springs 68 over a recess 70 formed in the top of the base structure 8; (2) a plunger 72 which slideably extends upwardly into the recess 70 through the top of the support cart 4 and through the base structure 8 and has an upper end which is in contact with the bottom of the container support plate 62; an O-ring 74 positioned in a groove around the plunger 72 to provide a seal between the plunger 72 and the vacuum chamber base structure 8; a bracket 76 secured to the underside of the top 32 of the support cart 4 in alignment with the plunger 72; a compression spring 78 which is installed between the bracket 76 and a radially extension 80 provide around the plunger 72; and a proximity sensor 82 which is held by the bracket 76. The compression spring 78 holds the plunger 72 in contact with the bottom of the container support plate 62.

In operation, as the amount of product collected in the product container 12 increases, the weight of the container 12 deflects the right end portion 66 of the container support plate 62 further downward into the recess 70 in the top of the vacuum chamber base structure 8. This in turn also deflects the plunger 72 downward, thus moving the plunger 80 closer to the proximity sensor 82. The sensor assembly 28 is preferably calibrated by adjusting the vertical position of the proximity sensor 82 on the bracket 76 so that, when product container 12 is full, the weight of the container 12 will be such that the plunger 80 will be deflected downwardly into alignment with the proximity sensor 82. At that point, the proximity sensor will send a signal to the apparatus control system which will cause the control system to shut down the vacuum producing device 15.

The inventive vacuum apparatus 2 will also preferably include a proximity sensor 84 which adjustably extends from the stationary member 50 of one of the cover hinge assemblies 14. The position of the proximity sensor 84 is calibrated such that, when the vacuum chamber cover 10 is lowered such that the hinge pivoting member 52 is in alignment with the proximity sensor 84, the sensor 84 will send a signal to the control system which indicates that the cover 10 is in closed position and is ready for vacuum to be applied.

The product suction conduits 22 extending from the cover suction inlets 20 are preferably flexible suction hoses which are from about 0.5 to about 2 inches, more preferably about one inch, in internal diameter. As noted above, when needed, for example, for detaching poultry or meat trim products from carcass shells, rotary knives 24 can be secured on the distal ends of the product suction conduits 22. By way of example, but not by way of limitation, the rotary knives 24 can be Bettcher Whizard TrimVac knives or similar devices of the type disclosed in U.S. Pat. No. 7,107,887, the disclosure of which is incorporated herein by reference in its entirety.

The apparatus controls located in or on the control box 26 preferably include at least a variable speed drive, a start push button, a push button e-stop, and a fused disconnect.

When the inventive vacuum apparatus 2 is used, for example, for recovering breast sub-tenders from chicken carcass shells at the end of a cone line, the apparatus cart 4 is rolled into position adjacent to the cone line and the apparatus power cord (not shown) is plugged into an electrical outlet or extension. Also, the product collection container 12 is placed in the vacuum chamber 6 on top of the sensor plate 62 and the apparatus cover 10 is closed. Next, the apparatus is turned on to produce a vacuum pressure in the vacuum chamber 6 formed inside the cover 10.

As the cone line conveys the carcass shells into position, the wishbones, if still present on the carcass shells, can be removed to expose the sub-tenders. Next, one, two, or more workers operating product suction hoses or other conduits 22 extending from the inventive vacuum apparatus 2 can use the rotary knives 24 on the ends of the product hoses to dig out and detached the sub-tenders from the carcass shells so that the detached sub-tenders are then automatically suctioned into and through the vacuum hoses 22. When the sub-tenders are suctioned through the suction inlets 20 in the top of the vacuum chamber cover 10, the sub-tenders fall by gravity into the product collection container 12. Eventually, as the weight amount of the product collected in the product container 12 increases to the point indicating that the container 12 is full, the resulting deflection of the sensor plate 62 and the sensor plunger 72 is detected by the proximity sensor 82 and the vacuum apparatus 2 is automatically shut down for removal and replacement of the full product container 12.

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims

What is claimed is:

1. An apparatus for recovering a product comprising:
    a vacuum chamber comprising a cover, a base structure, and at least one product suction opening located in said cover, said vacuum chamber having an interior volume and
    a product container having a top opening, said product container being a tote box having a vertical height and said product container being removably positionable in said vacuum chamber with said top opening positioned elevationally below said product suction opening such that a product suctioned into said vacuum chamber through said product suction opening will fall into said product container by gravity;
    wherein said cover for said vacuum chamber is openable for positioning said product container in and removing said product container from said vacuum chamber;
    said cover has an interior volume and a bottom opening and said interior volume of said cover forms at least most of said interior volume of said vacuum chamber;
    said cover is lowerable onto said base structure for closing said vacuum chamber;
    when said product container is positioned in said vacuum chamber with said cover lowered onto said base structure for closing said vacuum chamber, at least most of said vertical height of said product container is received in said interior volume of said cover; and
    said apparatus further comprises a suction device positioned outside of said vacuum chamber and having a suction inlet in fluid communication with said vacuum chamber.

2. The apparatus of claim 1 further comprising at least one hinge assembly connected to said cover for pivoting said cover downwardly onto and upwardly off of said base structure wherein said hinge assembly has a pivot axis for raising and lowering said cover which is elevationally higher than a top of said base structure.

3. The apparatus of claim 2 wherein said hinge assembly further comprises a gas lift assist cylinder connected between a stationary base member of said hinge assembly and a pivoting member of said hinge assembly which extends from said cover and is pivotably connected to said stationary base member.

4. The apparatus of claim 1 further comprising a vacuum seal element which is sealingly positioned between said base structure and a bottom edge of said cover when said cover is positioned on said base structure, wherein said bottom edge of said cover surrounds said bottom opening of said cover.

5. The apparatus of claim 1 wherein said suction device is a regenerative blower.

6. The apparatus of claim 1 further comprising:
a suction conduit extending from said product suction opening and
a rotary knife secured on a distal end of said suction conduit.

7. An apparatus for recovering a product comprising:
a vacuum chamber having at least one product suction opening;
a product container having a top opening, said product container being removably positionable in said vacuum chamber with said top opening positioned elevationally below said product suction opening such that a product suctioned into said vacuum chamber through said product suction opening will fall into said product container by gravity;
a cover for said vacuum chamber which is openable for positioning said product container in and removing said product container from said vacuum chamber;
a suction device positioned outside of said vacuum chamber and having a suction inlet in fluid communication with said vacuum chamber; and
a load detection assembly which detects an amount of said product in said product container when said product container is positioned in said vacuum chamber.

8. The apparatus of claim 7 wherein said vacuum chamber comprises said cover and a base structure, said product suction opening is located in said cover, and said load detection assembly comprises:
a container support element in said vacuum chamber on which said product container is removably positionable, said container support element being retained by said base structure such that at least a portion of said container support element will move downwardly as a weight amount of said product in said container increases and
a sensor which senses a vertical position of said portion of said container support element.

9. The apparatus of claim 7 wherein said load detection assembly is operable for sending a signal to shut down said suction device when said product container is full.

10. An apparatus for recovering a product comprising:
a vacuum chamber having at least one product suction opening;
a product container having a top opening, said product container being removably positionable in said vacuum chamber with said top opening positioned elevationally below said product suction opening such that a product suctioned into said vacuum chamber through said product suction opening will fall into said product container by gravity;
a cover for said vacuum chamber which is openable for positioning said product container in and removing said product container from said vacuum chamber; and
a suction device positioned outside of said vacuum chamber and having a suction inlet which is placed in fluid communication with said vacuum chamber by a suction inlet conduit which extends from said suction inlet of said suction device at least partially through said base structure.

11. The apparatus of claim 10 wherein said suction device is a regenerative blower.

12. The apparatus of claim 10 wherein said suction inlet conduit extends upwardly through said base structure into said vacuum chamber to a height of from about 2 to about 6 inches.

* * * * *